United States Patent
Suresh et al.

(10) Patent No.: US 10,938,662 B2
(45) Date of Patent: *Mar. 2, 2021

(54) SYSTEM AND/OR METHOD FOR MAINTAINING HIGHLY-AVAILABLE, CONSISTENT, PARTITION-TOLERANT CLUSTERS USING CLIENT VOTERS

(71) Applicant: Software AG, Darmstadt (DE)

(72) Inventors: Albin Suresh, Kerala (IN); Ramesh Kavanappillil, Karnataka (IN); Christopher Dennis, Clear Spring, MD (US); Myron Scott, Orinda, CA (US); Christopher Schanck, Marriottsville, MD (US)

(73) Assignee: Software AG, Darmstadt (DE)

( * ) Notice: Subject to any disclaimer, the term of this patent is extended or adjusted under 35 U.S.C. 154(b) by 264 days.

This patent is subject to a terminal disclaimer.

(21) Appl. No.: 16/037,165

(22) Filed: Jul. 17, 2018

(65) Prior Publication Data
US 2020/0028750 A1 Jan. 23, 2020

(51) Int. Cl.
*H04L 12/24* (2006.01)
*H04L 29/06* (2006.01)
*H04L 29/08* (2006.01)

(52) U.S. Cl.
CPC .......... *H04L 41/12* (2013.01); *H04L 41/0813* (2013.01); *H04L 41/0893* (2013.01); *H04L 41/30* (2013.01); *H04L 67/1051* (2013.01); *H04L 67/42* (2013.01)

(58) Field of Classification Search
CPC .............. G06F 11/1662; G06F 11/183; H04L 2209/463; G07C 13/00
See application file for complete search history.

(56) References Cited

U.S. PATENT DOCUMENTS

| 9,836,366 B2 | 12/2017 | Schatz et al. |
| 9,983,957 B2 | 5/2018 | Tang et al. |
| 2005/0132154 A1* | 6/2005 | Rao ........................ H04L 67/322 711/162 |

(Continued)

OTHER PUBLICATIONS

Hadoop Wiki, Zookeeper—FAQ, retrieved Jul. 11, 2018, 2 pages. https://wiki.apache.org/hadoop/ZooKeeper/FAQ.

(Continued)

*Primary Examiner* — Oleg Survillo
*Assistant Examiner* — Christopher P Cadorna
(74) *Attorney, Agent, or Firm* — Nixon & Vanderhye PC

(57) ABSTRACT

Certain example embodiments relate to a distributed computing system including servers organized in a cluster and clients. One server is elected leader and is responsible for maintaining consensus information among the other servers. Each server is configured to determine whether a new leader election is to take place. If so, the respective server requests votes for a new leader from the other server(s) and determines whether it has won by a clear majority. Depending on the implementation, votes from eligible client devices are counted, either in a main election together with server votes, or in a tie-break election (if needed) after server votes. Once a server has won, the other servers are informed accordingly. It therefore is possible to maintain a highly-available, consistent, partition-tolerant cluster in the distributed computing systems, using client voters.

24 Claims, 10 Drawing Sheets

(56) References Cited

U.S. PATENT DOCUMENTS

2017/0116095 A1* 4/2017 Schatz ............... G06F 11/1425
2020/0036647 A1* 1/2020 Gupta ..................... H04L 67/10

OTHER PUBLICATIONS

IBM Knowledge Center, retrieved Jul. 11, 2018, 3 pages. https://www.ibm.com/support/knowledgecenter/en/SSRM2X_4.1.0/com.ibm.samp.doc_4.1/sampugusingtiebreaker.html.
Wikipedia—Raft (Computer Science), retrieved Jul. 11, 2018, 4 pages. https://en.wikipedia.org/wiki/Raft_(computer_science).
The Raft Consensus Algorithm, retrieved Jul. 11, 2018, 9 pages. https://raft.github.io/.
Diego Ongaro et al., "In Search of an Understandable Consensus Algorithm," retrieved Jul. 11, 2018, 18 pages. https://ramcloud.stanford.edu/wiki/download/attachments/11370504/raft.pdf.
U.S. Appl. No. 16/038,312, filed Jul. 18, 2018.

\* cited by examiner

SYSTEM AND/OR METHOD FOR MAINTAINING HIGHLY-AVAILABLE, CONSISTENT, PARTITION-TOLERANT CLUSTERS USING CLIENT VOTERS

TECHNICAL FIELD

Certain example embodiments described herein relate to techniques for distributed computing systems including a cluster of server computers and at least one client computer. More particularly, certain example embodiments described herein relate to leader election systems and/or methods for maintaining highly-available, consistent, partition-tolerant clusters in distributed computing systems, using client voters.

BACKGROUND AND SUMMARY

Distributed computing systems typically include a number of servers and a number of clients connected thereto. The servers may be organized into clusters, e.g., to act on request made by clients. For example, distributed computing systems can be used to store and/or process large amounts of data in connection with the current push to enable "Big Data" and Internet-of-Things (IoT) technologies, etc.

The servers in a cluster may need to coordinate activities and/or data. For example, it would be beneficial to keep track of what data has been stored to an archive system when there is a large amount of data to be stored, e.g., as is typical with Big Data technologies, when sensor data arrives in a large quantity and at a rapid pace from IoT-enabled devices or the like, etc. Similarly, when a request triggers a complex process including many executable components (as would be the case for map-reduce related operations, for example), it would be desirable to track which components have been executed and which remain to be executed. It also would be desirable to have one server responsible for receiving requests, dispatching operations for execution, and tracking the history of those operations, e.g., so that results can be collated, new operations can be dispatched, overall progress can be tracked, results can be returned when appropriate, etc. And it would be desirable to track changes to the system including, for example, the arrival or departure of new servers and/or clients, e.g., with that information being collated and disseminated to other members of the distributed computing system, as appropriate.

In brief, it would be desirable to maintain "consensus" within a cluster, and the consensus can relate to the composition of the system, actions associated with a request, and/or the like. The consensus can be achieved by electing a leader for a cluster in a distributed computing system, and the leader can aid in the distribution of information needed to maintain, in essence, one large state machine across a cluster of computing systems, helping to ensure that each node in the cluster agrees upon the same series of state transitions, e.g., for data storage, processing, and/or other purposes.

A leader in this sense can be "elected" in a distributed computing system using a number of different algorithmic approaches including, for example, the Raft leader election algorithm. In some current implementations of the Raft approach, a cluster has one elected leader that is responsible for managing log replication on the other servers of the cluster, thereby helping to simulate the existence of a large state machine. The leader can decide how new nodes are placed in the cluster, how data flows between nodes, and perform other associated operations, without consulting other servers. In some Raft implementations, the leader leads in these and/or other ways until it fails or disconnects, in which case there will be an election for a new leader. In some Raft implementations, an election is triggered to find a new leader whenever the cluster topology changes, e.g., whenever a new server node joins the cluster, an existing member leaves the cluster (e.g., because of a failure), etc. In general, a server can be a leader, a follower, or a candidate to become a leader.

When an election takes place, a server "wanting" to become the leader is considered a candidate and can send a vote request to all of its peer nodes with a "term number" and with weight information. The term number is a positive integer starting with zero for the very first election and is incremented on each subsequent election. The weight information includes the server's current state (leader or follower), the last transaction sequence ID that it has processed, the time it was started, etc.

A server in the cluster, on receiving the vote request from a peer node, can vote for that peer if and only if the term number in the request is greater than the current term. When there are requests received from multiple servers, then their weights are compared sequentially to pick the "best" leader. For example, a request from an existing leader may be given preference over another candidate that was just recently a follower. But if all of the candidates are followers, then the next preference may be given to a server with a higher transaction ID and a higher total up-time (which might be indicative of the "oldest" server in the cluster).

Once a vote is cast for a server for a given term, all subsequent requests from other servers for the same term or lower are ignored by the node that has voted. If the candidate receives votes from a majority of servers (counting its own vote), it becomes the leader. The leader synchronizes all of the peers with its current term number so that the cluster-wide term is consistent. This helps ensure that every server request for a vote involves a vote for the same term number in subsequent elections and, as a result, helps reduce the likelihood of any single election resulting in multiple leaders for that particular election.

Network partitions can affect the availability of a cluster with this design. A network partition in this sense may be thought of as a communication break (physical and/or logical) between nodes in the cluster. A network partition of this type may be thought of as a failure or exception, and can be caused by, for example, a hardware and/or software failure in the network such as a failed or overloaded switch connecting the nodes. When the communication between nodes is broken, the cluster could be split into several smaller groups, as depicted in FIG. 1. That is, FIG. 1 shows a network partition creating two groups, with each group including one server and multiple clients. When the cluster is split as shown in FIG. 1, and upon detection that communication with some number of peer servers is broken (the one(s) on the other side of the partition), an election is triggered on each side of the partition.

Mandating a majority quorum for the leader election makes the system tolerant to such network partitions, as a leader will only be elected on the side with a majority of nodes. Unfortunately, however, if multiple partitions split the cluster into several smaller groups without leaving any single group with a majority, a leader will not be elected, potentially rendering the cluster unavailable. Yet network partitions of the sorts discussed above generally are considered rare in a cluster, and having multiple such failures simultaneously are considered even rarer. Thus, for practical purposes, tolerance to a single network partition typically is deemed sufficient for fault tolerance purposes in many computer systems.

There are of course mission critical systems where fault tolerance requirements are very tight including, for example, air traffic control, emergency dispatch, and other systems that rely on computer network "backbones." But even beyond these potentially life-and-death situations, an organization might designate certain of its systems mission critical. Indeed, online ordering systems for large e-tailers, logistics operations for shipping companies or companies shipping perishable items such as food or medications, plant control systems for steel and glass factories, and the like, oftentimes have very tight fault tolerance requirements and are demanding in terms of required availability. And as more and more functionality is entrusted to the cloud, as more and more data becomes "virtualized," and as more and more operations are spread across the world, the need for better fault tolerance and high availability in distributed computing systems increases concomitantly.

Moreover, although a majority quorum based election approach can tolerate network partitions quite well in clusters with an odd number of servers (insofar as a single network partition splitting the cluster is guaranteed to leave a majority of nodes on one side), that topology is not always the case. Indeed, not all networks include an odd number of servers in a given cluster, and a network partition could split the servers into two equal halves when there are an even number of servers deployed to a cluster. In that situation, neither side will have a clear majority and thus will be unable to elect a leader. And the inability to elect a clear leader could render the entire cluster unavailable.

In a two-node cluster for which the majority quorum is two as well, the problem is even more severe, as a network partition between the servers will always split them into two equal halves (with one member in each half), leaving the cluster without a majority and thus without a leader. It will be appreciated that what makes this scenario worse for a two-node cluster is that it is not even tolerant to a single node failure. In other words, even when only one node fails, the other one will not be able to win the ensuing election because it then can only receive its own vote—which is not the proper majority of votes—and thus the cluster will lack a leader even though there is one functional server node.

This example scenario is depicted in the sequence of FIGS. 2A-2D. In this regard, FIG. 2A shows a properly functioning cluster with an even number of nodes. In FIG. 2A, there is one leader L and one follower F to which clients C1-C5 can connect. FIG. 2B shows a network partition, splitting the cluster into two parts. In FIG. 2B, it is unclear which node is the leader and which is the follower, as reflected by the question marks on the servers. The partition triggers an election on both sides of the partition, as shown in FIG. 2C. However, because the servers cannot talk to one another, each server is guaranteed to receive only one vote, namely, its own. This results in the situation shown in FIG. 2D, where neither server receives a majority of votes and, thus, neither server wins the leader election. The cluster therefore is rendered inoperable, as reflected by the exclamation points in FIG. 2D.

Attempts have been made to solve problems associated with leader election, e.g., in the case where there are an even number of nodes. In general, existing solutions attempt to solve this problem by adding into the cluster additional server nodes or other kinds of special nodes. For example, one proposed solution involves mandating an odd number of servers in a cluster so that an even split with a network partition will never occur. Yet two-node deployments are very common in practice, and adding a third server node could be costly and not always feasible.

To help reduce the costs associated with a fully-functional and deployed additional server, another proposed solution uses one or more dummy servers that only participate in elections and do not act as full-fledged peer servers in the cluster. Yet even this approach requires an additional node of at least some sort. And even though a light-weight node may be used in some instances, complexity nonetheless is introduced into the system and there is still at least some cost and configurational complexity.

Another proposed solution involves adding a third node in the leader election system in the form of a tie-breaker so that when the existing servers are evenly split by a network partition and fail to elect a leader on their own, they can approach these tie-breakers so that one of them can win the election. Tie-breaking nodes typically are implemented as shared disk solutions, or as external tie-breaking server nodes. But even in this proposal, there is still an additional node introduced into the cluster, albeit possibly temporarily.

Still another approach to solving the above-described and related problems involves differently weighted servers. In this approach, one server is assigned more voting weights or more "voting power" than others. For instance, in a two node cluster, one server may be assigned two voting rights and the other server may be given only one, making the total number of votes in the system equal to three, which is an odd number. One advantage of this approach is that if a network partition splits the servers, or if the server with the lower weight fails, the server with the higher weight can win, as its extra voting rights can give it the majority (2 out of 3 votes in this example). Yet if the server with the higher weight fails, the other one cannot win, as it has just one out of three votes. Moreover, this solution tends to be skewed towards making the special server with the added weights the leader in most instances, which will not always be advantageous, e.g., because a partition might occur in which no clients are connected to it.

It thus will be appreciated that extra and dummy server approaches, and the external tie-breaker approach, require an extra node in the cluster, which introduces additional costs, be it monetary and/or computational in nature, as the expansion of the cluster to accommodate the extra node requires added maintenance and monitoring with respect to that expansion.

Another drawback with the approaches relying on an external entity deciding the leader is that it could still render a cluster unavailable from the clients' perspective. For example, if a cluster with two servers {S1, S2} and clients {C1, C2, C3} is split by a network partition that leaves S1 alone on one side and S2 with all other clients on the other side, it would be desirable to have S2 win that election, because it then is the only server left that is useful to the clients. But if S1 wins as a result of the external entity's influence, the cluster is still unavailable for the clients. An external entity may choose S1, as its choice could be arbitrary and may not represent the clients' needs.

It will be appreciated that it would be desirable to overcome the above-identified and/or other problems. For example, it will be appreciated that it would be desirable to increase the fault tolerance of, and create highly-available, distributed computing systems, e.g., by improving upon leader election techniques in such systems.

One aspect of certain example embodiments relates to overcoming the above-described and/or other issues. For example, one aspect of certain example embodiments relates to making it possible to elect leaders in distributing computing systems upon network partitions, even where the clusters therein include even numbers of nodes.

Another aspect of certain example embodiments relates to improving the availability and fault tolerance of an even-node cluster when a network partition splits it equally and/or improving the availability and fault tolerance of a two-node cluster when a single node fails. Advantageously, it is possible to provide these solutions without using an external system other than the servers and clients in the cluster.

Another aspect of certain example embodiments relates to a leader election process between servers that makes selective use of at least some of the clients connected thereto as voting members, e.g., to resolve ties.

As will become clearer from the description below, certain example embodiments are able to address the technical issues of distributed network system availability and fault tolerance in a technological way, namely, by adapting the leader election algorithm to make use of the already-deployed and functional client systems. This is technically advantageous, e.g., because there is no need to add additional nodes or use external nodes (even temporarily) because existing clients in the cluster can be used, making maintenance and monitoring more straightforward, leader election more seamless from a technical standpoint (since the voting clients are already present in the system), etc. The approach outlined herein also is technically advantageous because the tendency to skew towards a particular, designated special server can be avoided. By contrast, the servers are treated equally and hence, no matter which one fails, the other gets a chance to win with the help of client votes. This in turn reflects, in essence, an enhanced weighting to the clients' demand and helps guarantee that the elected leader will be available for at least a majority of the clients, if not all of them, resulting in more availability to a potentially broader number of clients—leading to increased availability and better fault tolerance.

In certain example embodiments, a distributed computing system is provided. Servers are organized in a cluster, with each said server including first processing resources including at least one first processor and a first memory. Client devices are operable to connect to the cluster and issue requests to the servers, with each client device including second processing resources including at least one second processor and a second memory. One of the servers is elected as a leader and is responsible for maintaining consensus information among the other servers. The consensus information includes data indicating a shared operating state of the servers in the cluster, which server in the plurality of servers is elected as the leader, and which client device(s) is/are eligible to vote. The shared operating state relates to requests issuable by the client devices. The first processing resources of each server are configured to control the respective server to determine whether a new leader election is to take place and, in response to a determination that a new leader election is to take place: request votes for a new leader from the other server(s) in the plurality of servers; receive any votes sent from other server(s); determine whether the respective server has won the election by receiving a clear majority of votes cast; and responsive to a determination that the respective server has won the election with a clear majority of the votes cast, distribute consensus information to the other server(s) about the respective server now being the leader. Responsive to a determination that the respective server has not won the election and that no other server in the plurality of servers has won the election, the respective server is further controlled to: request votes for a new leader from the client device(s) that is/are eligible to vote as indicated in the consensus information; receive any votes from the client device(s) that is/are eligible to vote; determine whether the respective server has won the election by receiving a clear majority of votes now cast, including votes cast by the client device(s) that is/are eligible voters; and responsive to a determination that the respective server has won the election with a clear majority of votes now cast, including votes cast by the client device(s) that is/are eligible voters, distribute consensus information to the other server(s) about the respective server now being the leader.

In certain example embodiments, a distributed computing system is provided. Servers are organized in a cluster, with each said server including first processing resources including at least one first processor and a first memory. Client devices are operable to connect to the cluster and issue requests to the servers, with each client device including second processing resources including at least one second processor and a second memory. One of the servers is elected as a leader and is responsible for maintaining consensus information among the other servers. The consensus information includes data indicating a shared operating state of the servers in the cluster, which server in the plurality of servers is elected as the leader, and which client device(s) is/are eligible to vote. The shared operating state relates to requests issuable by the client devices. The first processing resources of each server are configured to control the respective server to determine whether a new leader election is to take place and, in response to a determination that a new leader election is to take place: request votes for a new leader from the other server(s) in the plurality of servers; receive any votes sent from other server(s); request votes for a new leader from the client device(s) that is/are eligible to vote as indicated in the consensus information; receive any votes from the client device(s) that is/are eligible to vote; determine whether the respective server has won the election by receiving a clear majority of votes cast, including votes cast by the client device(s) that is/are eligible voters; and responsive to a determination that the respective server has won the election with a clear majority of votes cast, including votes cast by the client device(s) that is/are eligible voters, distribute consensus information to the other server(s) about the respective server now being the leader.

In addition to the features of the previous paragraphs, counterpart methods, non-transitory computer readable storage media tangibly storing instructions for performing such methods, executable computer programs, and the like, are contemplated herein, as well. Similarly, servers, client devices, and the like, usable in connection with the systems laid out in the previous paragraphs, also are contemplated herein.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments described herein relate to leader election systems and/or methods for maintaining highly-available, consistent, partition-tolerant clusters in distributed computing systems, using client voters. That is, certain example embodiments involve a leader election for servers that includes as voting members at least some clients that are in the system. Thus, for example, a cluster with an even number of servers may include an odd number of clients as voters as well. These client voters can participate in server elections and help elect a leader, e.g., in situations where the servers are not able to form a majority on their own. With the client voters added, the cluster is in essence notionally adjusted to include an odd number of effective voting members. This way, the possibility of an "even split" of a cluster into different partitions with even numbers of nodes in each resulting partition, and the possibility of all servers failing to receive a majority of votes, are reduced and sometimes even eliminated, as the incorporation of an odd number of client voters into a partition with an even number of servers will result in an odd number and a majority being given to one server.

Figure 1:
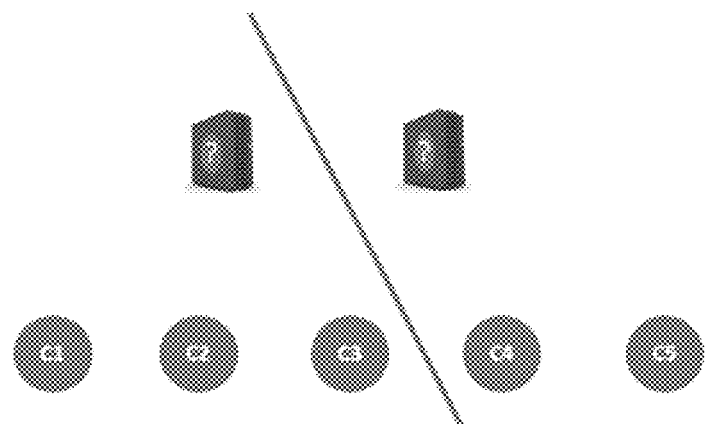
FIG. 1 shows a network partition creating two groups, with one server and multiple clients in each group.
Figure 2A:
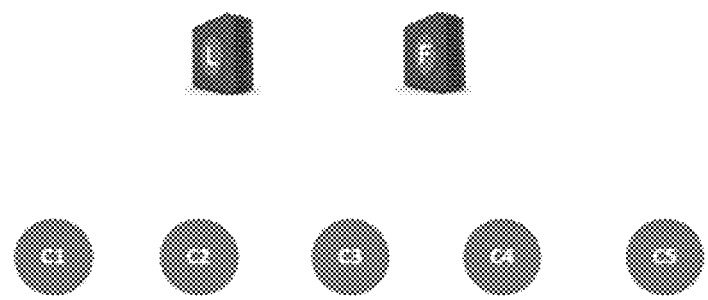
FIGS. 2A-2D show how some conventional leader election approaches can result in cluster unavailability in certain instances.
Figure 2B:
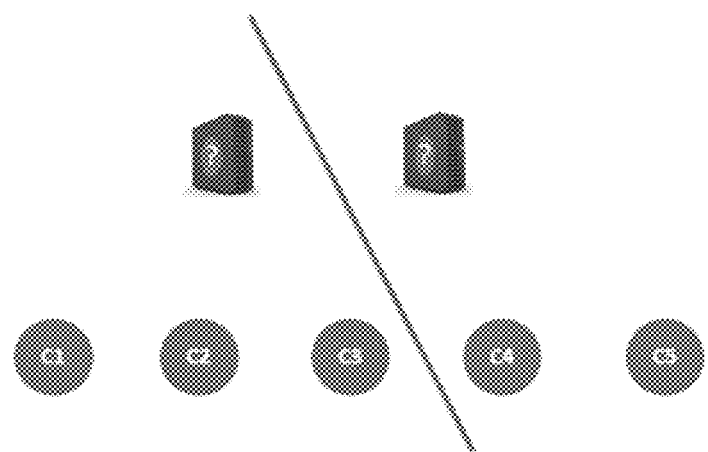
Figure 2C:
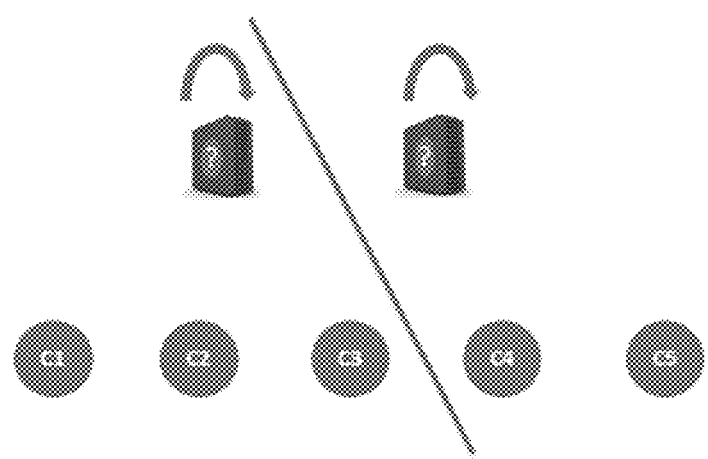
Figure 2D:
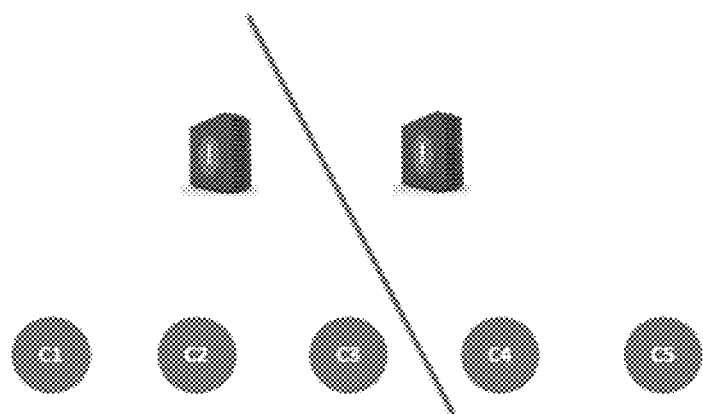
Figure 3A:
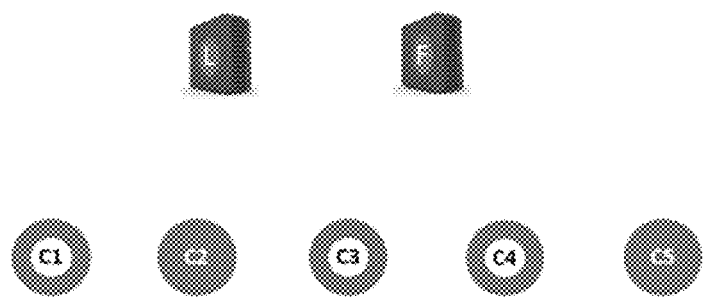
FIGS. 3A-3G show how selectively using clients as voters along with servers can help result in a successful leader election upon a partition, in accordance with certain example embodiments.
Figure 3B:
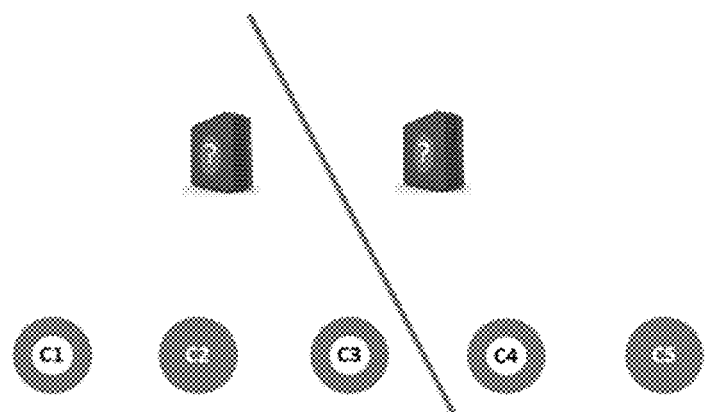

The sequence shown in FIGS. 3A-3G demonstrates how selectively using clients as voters along with servers can help result in a successful leader election upon a partition, in accordance with certain example embodiments. In this regard, FIG. 3A shows a cluster with a leader server L, a follower server F, and five clients C1-C5. Among clients C1-C5, clients C1, C3, and C4, are designated voters. FIG. 3B shows a network partition splitting the cluster into two halves. On one half are the first server along with clients C1-C3, and on the other half are the other server with clients C4-C5.

Figure 3C:
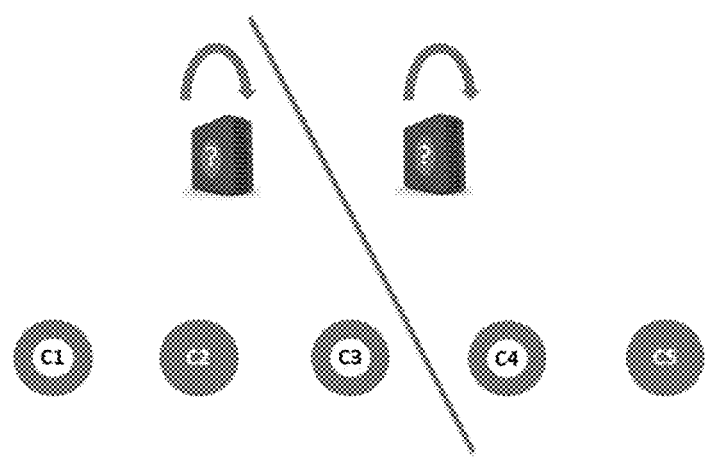
Figure 3D:
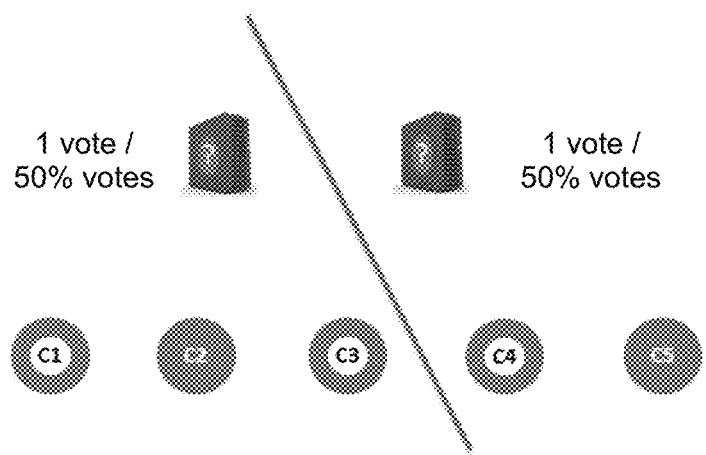

The partition causes elections to take place on each side of the partition as shown in FIG. 3C. That is, the servers, on detecting the communication break with their peer, start elections on both sides of the break. In this initial election, each server receives exactly one-half of the votes, so neither side receives a clear majority and there is no elected leader on either side of the partition, as reflected in FIG. 3D.

Figure 3E:
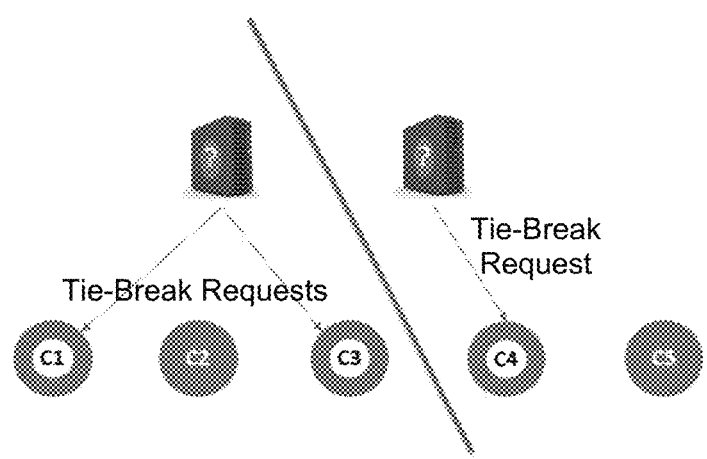
Figure 3F:
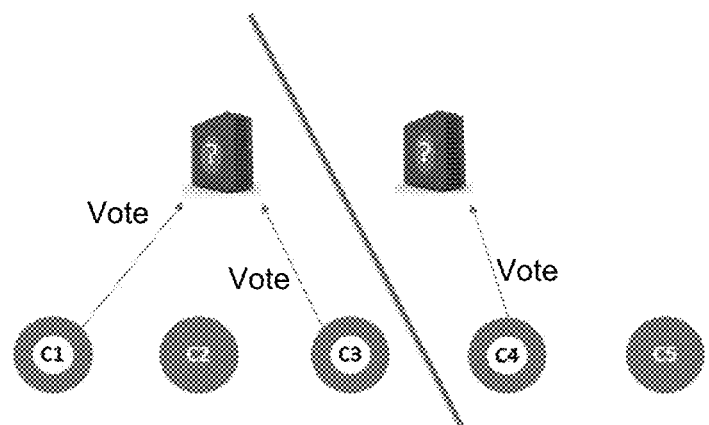
Figure 3G:
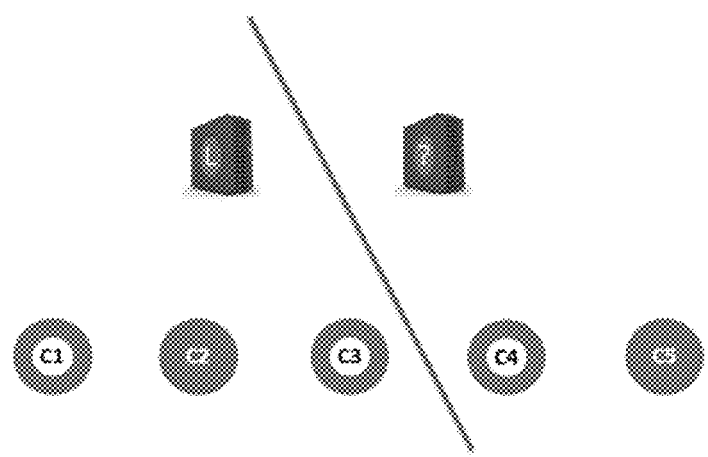

Both servers, having received exactly 50% of the sever votes available (less than a clear majority), attempt to break the tie by request votes from an odd number of tie-breaker clients. As shown in FIG. 3E, this involves the server on the left side of the partition requesting tie-breaking votes from the designated tie-breaking clients C1 and C3 with which it is in communication, and the server on the right side of the partition requesting tie-breaking votes from the designated tie-breaking client C4 with which it is in communication. As shown in FIG. 3F, the first server receives two total votes (one vote from each of clients C1 and C3), whereas the second server receives one total vote (one vote from client C4). Thus, as shown in FIG. 3G, the server on the left side of the partition is elected the leader. That is, it receives two-thirds of the tie-breaking votes and wins the election, having now received a majority. The other server does not win because it has just one-third of the tie-breaking votes. Because the first server is the leader, it is made available to the clients on its side of the partition. Clients C4 and C5 cannot reach the newly elected leader because they are on the other side of the partition and, in some instances, they may be stalled until the partition is corrected. Thus, even though the system is not completely available to all existing clients, the FIG. 3G system has improved availability compared to what otherwise would occur, e.g., as can be confirmed via a comparison with the FIG. 2A-2D example.

Example Implementation

Details concerning an example implementation are provided below, e.g., in terms of voter registration and election operations. It will be appreciated that this example implementation is provided to help demonstrate concepts of certain example embodiments, and aspects thereof are non-limiting in nature unless specifically claimed. For example, descriptions concerning example classes, functions, component configurations, etc., are non-limiting in nature unless specifically claimed.

Figure 4:
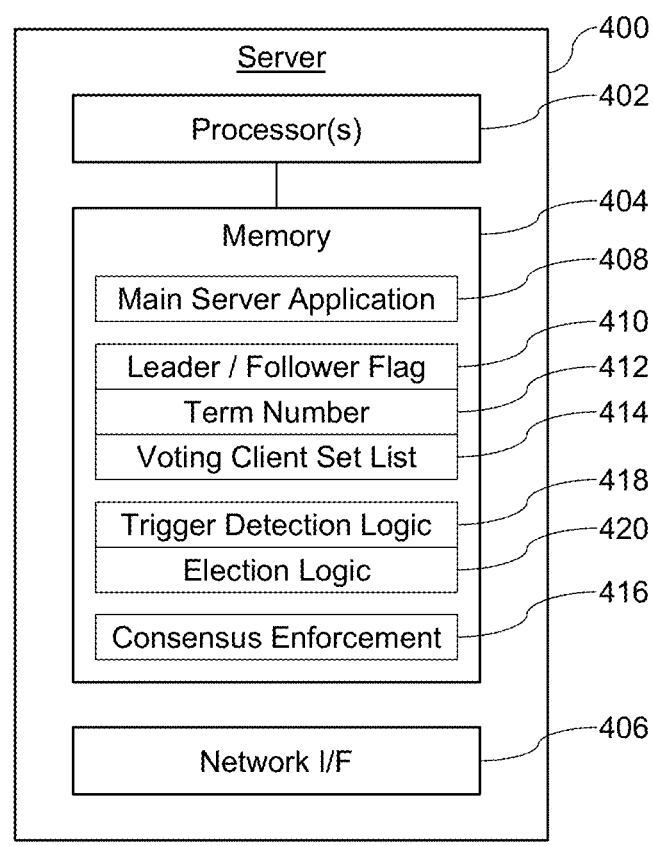
FIG. 4 is a block diagram showing an example server that may be used in connection with certain example embodiments.
Figure 5:
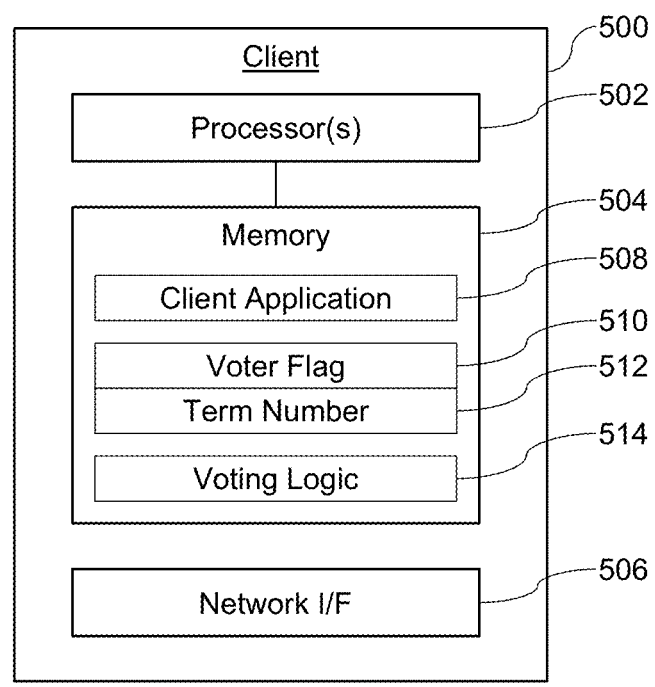
FIG. 5 is a block diagram showing an example client that may be used in connection with certain example embodiments.

By way of example, FIG. 4 is a block diagram showing an example server 400 that may be used in connection with certain example embodiments, and FIG. 5 is a block diagram showing an example client 500 that may be used in connection with certain example embodiments. In a distributed computing system according to certain example embodiments, there may be multiple of such servers in a cluster, and one or more of such clients may connect to those servers. The servers in the cluster handle requests from the clients and provide results, e.g., for the above-noted and/or other example purposes. The FIG. 4 server 400 includes processing resources including one or more processors 402 operably coupled to a memory 404. The memory 404 may be any suitable combination of transitory and non-transitory computer readable media. For instance, RAM, disk, networked storage tiers, and/or the like may be used in this regard. A network interface 406 connects the server 400 to one or more peer servers in the cluster, as well as to the one or more clients. The memory includes a main server application 408 that helps perform the purposes for which the server 400 is deployed. A leader/follower flag 410 indicates whether this particular server 400 is a leader or a follower at any given time. Weight information including term number 412 also is stored in the memory 404. The leader/follower flag 410 and weight information including term number 412 help provide more conventional Raft algorithm functionality in certain example embodiments. As described in greater detail below, the server 400 maintains list 414 of which clients are allowed to participate in leader elections. This list is consulted when there a particular election fails to produce a clear leader based on a failure of any single server to receive a majority of the votes cast in certain example embodiments. In other example embodiments, the list is consulted any time there is an election, e.g., to supplement the votes cast by servers. The trigger detection logic 418 may watch for network partitions or communication breaks, changes to the devices provided to the network (e.g., the deployment or removal of servers), etc. The trigger detection logic 418, upon receiving a suitable stimulus, triggers the server-side election logic 420, which helps ensure that a new leader is elected, sets the leader/follower flag 410 and updates term number 412 when appropriate, etc. Further details concerning this program logic are provided below in connection with FIG. 6 and Appendix B. The consensus enforcement module 416 helps ensure that other servers in the cluster know who the leader is, what the current term is, which clients are identified in the voting client set list 414, who is executing which parts of the main server application 408, etc. It will be appreciated that the consensus enforcement module 416 is activated only when the server 400 is a leader.

The example client 500 shown in FIG. 5 includes processing resources configured similarly to those discussed above. For instance, as shown in FIG. 5, at least one processor 502 is connected to a memory 504, and a network interface 506 connects the client 500 to the network and, ultimately, servers therein. The client application 508 issues requests to be fulfilled by the servers. The voter flag 510 indicates whether this particular client 500 is eligible to participate in server leader elections and may, for example, be set upon initial registration of the client, updated upon a client identified in the voting client set list 414 joining or dropping offline, etc. The term number 512 is indicative of the current term. When client 500 has voting rights, the voting logic 514 may be used to receive and respond to requests from servers for votes. Example details of the voting logic 514 is explained in greater detail below in connection with FIG. 7 and Appendix C. It will be appreciated that the logic itself may be located remote from the client 500 in certain example embodiments, e.g., with the client 500 simply issuing API, RPC, and/or other calls thereto.

In certain example embodiments, the server count is specified at network configuration time. As a result, in such implementations, the number of servers needed to reach a majority also is set (explicitly or implicitly) at network configuration time. This value can be replicated for, distributed to, or otherwise accessed by, follower servers. It therefore is possible for each server to know what the majority number is, in terms of the majority number for only servers. In certain example embodiments, the number of client voters to be included in the election process, and/or an upper limit thereon, also is/are preconfigured on cluster or server startup, which helps ensure that the servers are aware of the number of voters (including servers and/or client voters) in the system. In certain example embodiments, the sum of the number of servers and client voters in the system is set as an odd number. In certain example embodiments, the number of client voters in the system is set as an odd number, without regard to the number of servers in the cluster. This value is validated on cluster and/or server startup. As explained in greater detail below, in certain example implementations, the actual number of voting clients may be maintained dynamically as different clients join and leave the cluster. This list of client voters is maintained by the leader and replicated for/distributed to the followers, as also set forth in greater detail below. When the list of client voters is replicated for/distributed to the followers, it therefore is possible for each server to know what the majority number is in terms of both the servers and the voter clients.

Once the servers are started, the voting clients register themselves with the servers as potential voters in the elections of servers. An API may be used by the potential voter clients to indicate to the servers that they are eligible to cast votes. For instance, a voting client can be instantiated as follows:

TCVoter voter=new TCVoter( );
voter.register(host1:port1, host2:port2, host3:port3);

There are a number of different strategies that can be employed when choosing which clients to be the voters. For example, it may be desirable in certain example instances to pick the clients that are most critical to, or important for, the application being run or mediated by the cluster, the organization as a whole, or the like. This may include, for example, client devices that are likely to and/or actually do remain connected with the cluster for long durations. Conversely, it may be undesirable to select as voters transient clients that join and disappear quickly, for example, because they might not be present when their votes are needed. In certain example instances, it may be the case that all clients are equivalent or substantially equivalent in terms of importance, criticality, length of time connected to the cluster, length of uptime, and/or the like and, in such cases, all such client devices may be designated as voters. Here, the server may pick voters on a first-come, first-serve basis. For instance, if there are n voters configured on the server, only the first n voting clients requesting to be registered with the cluster will be added as voters, and other registration requests will be declined and put on hold until another vacancy for a voter is created. As another example, if there are n voters configured on the server, only the first m voting clients requesting to be registered with the cluster will be added as voters, where m is less than n and where the sum of m and the number of servers is an odd number. In such cases, m may be set in advance by an authorized user. In certain example embodiments, the registration may be server-initiated. For example, after the servers are brought up and a certain number of clients join, the servers may select the clients to become voters. This server-side selection may be based on, for example, connection strength, proximity, quality-of-service metrics, random selection, and/or the like.

The set of voters is consistent among the servers in the cluster. If the set of voters is different for different servers or if there is some other inconsistency, multiple leaders in the cluster could be elected at the same time, which would be undesirable for many scenarios. For example, in a cluster with servers {A, B} configured with the voter limit configured as one, and with clients {C1, C2} designated as voters, if A has C1 in its voter set and B has C2 in its voter set, an election triggered by a network partition would make the servers solicit votes from their voting clients—but, here, the requests would be distributed to different clients. Because C1 would receive a vote request only from A, it will vote for A, and C2 would vote for B under analogous circumstances. Because both servers receive votes, they both will become leaders, leading to an inconsistent state for the cluster, sometimes referred to as a split-brain state (e.g., where there are multiple leaders). Thus, it can be seen that it would be desirable for all servers to maintain consensus on the same voter list so that every server requests votes from the same set of voting clients.

In certain example embodiments, this consensus is maintained by the leader server when the clients are registered. To help ensure this, when a client tries to register itself with the cluster, the leader server will replicate that voter information to its follower servers. The voter registration will succeed if and only if it is accepted by all the servers. The voting client thus will refuse to participate in any election until it receives confirmation of acceptance from the leader.

There is a heartbeat mechanism between the voting clients and the servers. A voting client after successful registration will continue sending heartbeats to the server to keep itself connected to the server as a voter. If the heartbeat is broken, then the server will deregister that voting client, potentially opening up a vacancy for another voting client. This vacancy will in certain example embodiments be filled with the voting client having the oldest registration request among the connected clients. The vacancy may be filled in other ways in different example embodiments. For instance, the vacancy may be filled with a random selection, an administrator's manual selection, a selection of a client flagged as being critical (even though it might not be the oldest client in the system), etc.

When a voting client is disconnected from the server, it will be de-registered by the server. If that client reconnects, it will have to be registered again. However, in certain example embodiments, the voter will be re-registered on a reconnect if and only if another voter has not taken its place while it was disconnected. The server may in some instances wait a predetermined amount of time to enable registered clients to disconnect and reconnect rapidly prior to seeking a replacement voter for registration.

The voter list is maintained with an odd number of clients in certain example embodiments. If even numbers were allowed, then that could lead to the possibility of an even split with a network partition. The leader is responsible for maintaining the odd number of clients in the list and in keeping the voter list consistent across the cluster. Thus, when voting clients try to register themselves, the very first one may be added immediately and synced with the follower servers. When the second client tries register itself, its registration may be put "on hold" until a third client joins or the first one leaves, thereby helping to ensure that there is an odd number of clients present and that the odd-numbered list is propagated to servers. In either case, the voter list will have an odd number of members (1 or 3). Similarly, when a client voter is disconnected from the leader, one additional client voter may be removed from the list of voters (e.g., the newest member, the slowest member, the least critical member, etc., may be removed) to keep the number of voters in the list at an odd number. Whenever the voter list is contracted in this manner, the oldest clients may be given preference over the others, e.g., in a first-come, first-serve basis. This preference may be implemented by the leader, and the leader synchronizes the updated voter list with the followers.

Example code-level interaction between servers and voting clients is provided below. The interaction between servers and clients may be implemented as remote procedure calls (RPCs) in certain example embodiments. However, in the examples that follow, direct method calls are provided for clarity and ease of understanding.

Consistent with the description provided above, an example of how the server's voter list maintenance logic may be implemented is provided in Code Appendix A.

In certain example embodiments, the election between servers can be implemented at least at first as a standard Raft server election as described above and as is known to those skilled in the art. If a server receives the majority of votes from the peer servers in the straightforward Raft election, it is elected as the leader without involving the client voters. In this scenario, servers receiving less than half the votes will "give up" and just wait for a leader. But if a server receives exactly half the votes, which is insufficient for becoming a leader, it can still try and become the leader by soliciting more votes from the clients. This is referred to as a tie-breaking operation, as there can be two servers that have exactly half the number of votes, thereby leading to an exact tie. In this case, the client votes are used to break that tie. However, it will be appreciated that there are scenarios where an exact tie might not take place that still might be resolved using the clients' votes. For instance, the tie-breaking technique of having clients vote can be used in some instances (e.g., where there are four servers) where one server receives more than another server but still does not receive a clear majority and thus cannot become a leader. In any event, the server that manages to get votes from a majority of the clients, or at least enough votes to push its vote total to a clear majority, wins the tie-breaking and can become the leader.

Figure 6:
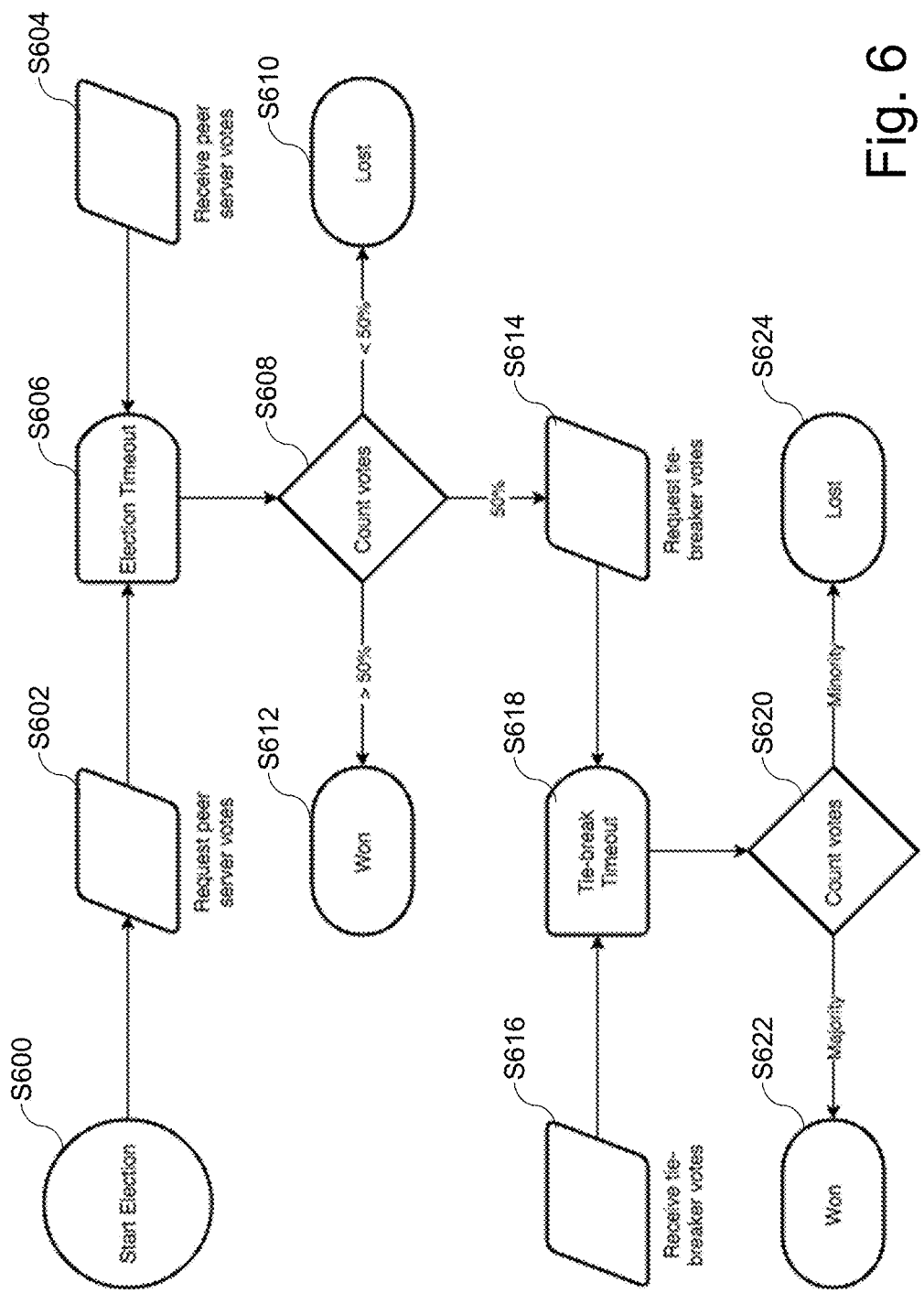
FIG. 6 is a diagram depicting the election flow from the server perspective, which may be used in connection with certain example embodiments.

FIG. 6 is a diagram depicting the election flow from the server perspective, which may be used in connection with certain example embodiments. As shown in FIG. 6, the election starts at step S600. The election trigger in certain example embodiments may be controlled by heartbeats. For example, when a server joins the cluster as a follower, it starts "heartbeating" with the leader. Similarly, in the event of the leader crashing, or being separated by a partition event, this heartbeat signal will break—and that break may be used as a trigger to start an election. Elections can take place on both sides of a communication break or partition if there are servers still active in such cases, e.g., as servers on both sides of the communication break or partition may detect the heartbeat break and act accordingly. If only one side remains active, the election may be detected on that side only and an election may be triggered on that one remaining active side. Peer server votes are requested at step S602, and they are received by the servers at step S604 until the election timeout occurs at step S606. The votes are counted in step S608. If a server receives less than 50% of the vote in this example, it has lost the election as indicated in step S610. If a server receives more than 50% of the vote, it wins the election in step S612, becomes the leader, and establishes consensus with the other servers.

However, if the server receives exactly 50% of the votes, tie-breaker votes are requested in step S614. It is noted that in certain example embodiments, this procedure may take place if no server receives more than 50% of the vote even if there is no server that receives exactly 50% of the vote. The tie-breaking proceeds, and tie-breaking votes are received from clients in step S616 until the tie to place tie-breaking votes has elapsed as determined in step S618. Given the odd number of client voters, the vote count in step S620 should result in one server winning with a majority of votes as determined in step S622, with all other servers losing with a minority of votes in step S624. In certain example embodiments, once a server wins the election (e.g., regardless of whether it has won at the initial vote or after the tie-break), only that winning server announces its victory to everyone. This victory announcement may be used to synchronize the term number, voter list, etc., with the rest of the cluster.

Consistent with the description provided above, an example of this server-side election logic may be implemented is provided in Code Appendix B.

The tie-breaking step on the client side is similar to the vote request processing performed on the server side. The voting client keeps track of the last election term for which it voted. When it receives a tie-breaking request from a server, it can vote if and only if the requested term is higher than its own tracked term. When multiple servers request to break the tie, the client can compare their weights to pick the best server. Upon casting a vote for a server, the client updates its own term number as well. Any subsequent request for votes for the same term or lesser will fail to get a vote from the client.

Figure 7:
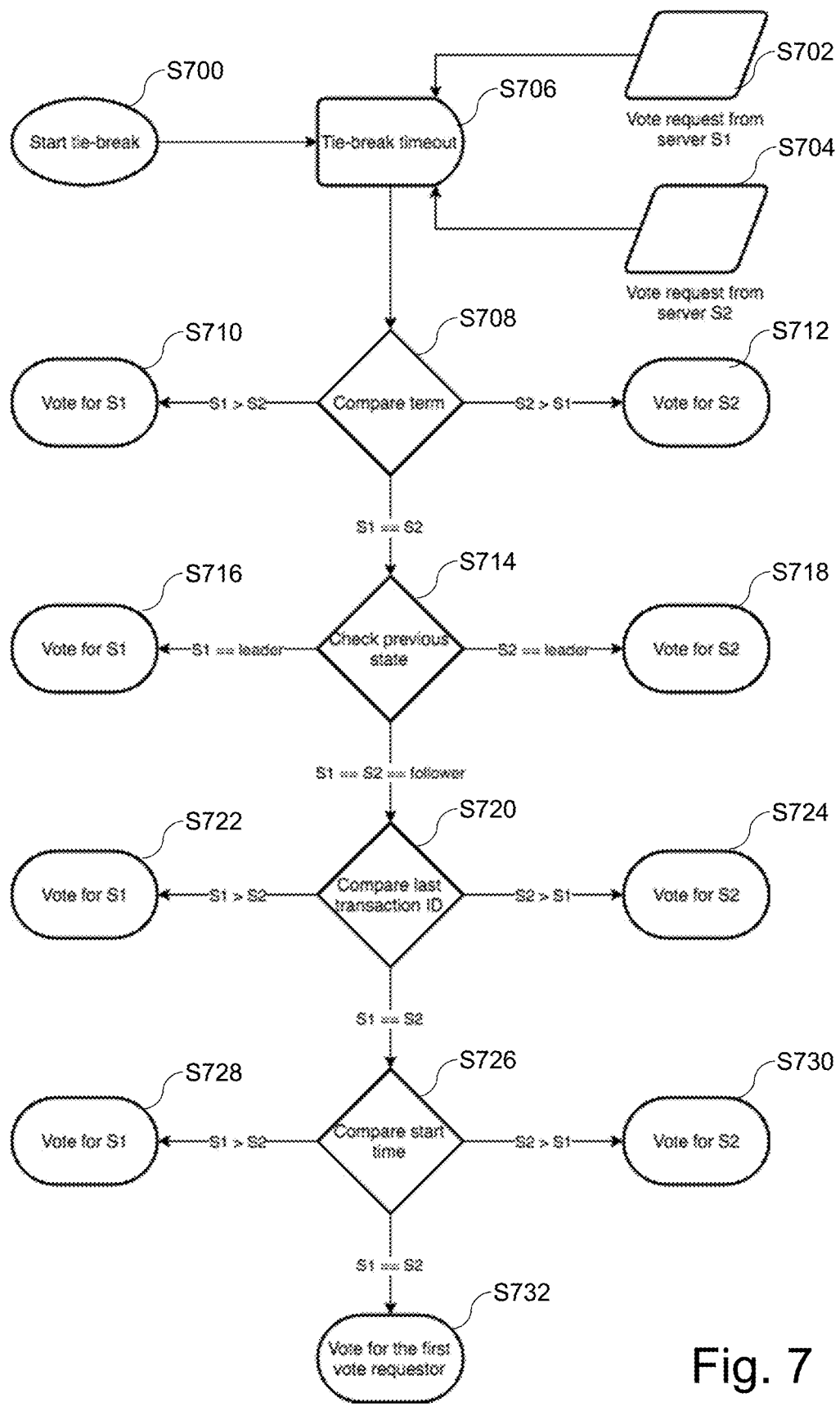
FIG. 7 is a diagram depicting the election flow from the client perspective, which may be used in connection with certain example embodiments.

FIG. 7 is a diagram depicting the election flow from the client perspective, which may be used in connection with certain example embodiments. As shown in FIG. 7, the tie-breaking process starts in step S700. Vote requests are received from servers S1 and S2 in steps S702 and S704. A timeout is imposed, as indicated in step S706. In certain example embodiments (e.g., where there are exactly two servers that each have received 50% of the vote), the tie-break timeout starts on the receipt of the first tie-break request from a server, and a timeout period is imposed until the second request is received or until the timeout expires (e.g., whichever comes first). In certain example implementations, there is no point waiting any further beyond receipt of the second request (e.g., because there are only two servers). In certain other example embodiments, the client waits for more requests for tie-breaking votes until the time has elapsed as determined in step S706. The FIG. 7 example includes a series of tests that may be used to determine which server to vote for. However, it will be appreciated that these and/or other tests may be used in different examples, that the order of the example tests shown in FIG. 7 may be changed, that some tests may be omitted, that an element of randomness may be introduced, etc., in different example embodiments. Referring once again to the specific FIG. 7 example, the term is compared in step S708. If the term of S1 is greater than the term of S2, then the client casts its vote for S1 in step S710. If the term of S2 is greater than the term of S1, then the client casts its vote for S2 in step S712. If the terms are the same, the previous state of the servers is checked in step S714. If S1 already was the leader, then the client casts its vote for S1 in step S716. If S2 already was the leader, then the client casts its vote for S2 in step S7168. If both S1 and S2 were followers, then the last transaction IDs for S1 and S2 are checked in step S720. It will be appreciated that, in certain example embodiments, the client interacts with the leader only, and the leader replicates those transactions (or a record thereof) to the followers with the corresponding transaction ID (implemented in some instances as a sequentially increasing number). Because replication to multiple servers could take varying amounts of time, it is quite possible that one server would have seen an update that another one has not yet seen. Thus, it may be desirable in certain example embodiments to give preference to the follower that has received the most recent transaction from the previous leader, and the transaction ID comparison may help in that regard. If the S1 is more recently than S2, then the client casts its vote for S1 in step S722. If S2 is more recently than S1, then the client casts its vote for S2 in step S724. If the transaction IDs are the same or substantially the same, then the start times of the servers is checked in step S726. Here a decision may be made to favor the "older" server, e.g., because it might be thought to be more stable (although in some instances it might be better to favor the "newer" server, e.g., because it could "last longer," include newer/better processing resources, etc.). In this example, if S1 is older than S2, then the client casts its vote for S1 in step S728. And in this example, if S2 is older than S1, then the client casts its vote for S2 in step S730. If both are of the same or substantially the same age, then the client may vote for the first requestor as shown in step S732 (or it may select one randomly, etc.). In certain example embodiments, regardless of when the vote is cast, the voters only inform the servers for whom they are voting that they are voting for them. In other words, in such cases, a given voter only informs the server for whom it votes that it is voting for that server, and it does not inform other servers who it is voting for/who it is not voting for.

Consistent with the description provided above, an example of this client-side election logic may be implemented is provided in Code Appendix C.

It will be appreciated that FIG. 7 provides one example of how votes may be cast. In certain example embodiments, rules, heuristics or the like, may enable clients to choose who they vote for in another way. Rules, heuristics or the like, can be based on, for example, bandwidth (e.g., between the client and the servers, of the servers themselves, etc.), distance, latency, a distributed policy like round robin or the like, a random assignment, etc.

In certain example embodiments, a tie-break in which client votes are counted will occur only when the server votes are split evenly between two servers (e.g., each server receives 50% of the server votes). In certain example embodiments, a server with less than 50% of the vote will not request a tie-breaker vote. Although certain example embodiments have been described in relation to scenarios in which there are exactly two servers, it will be appreciated that different example embodiments may involve different numbers of servers (e.g., different even number of servers).

Although certain example embodiments have been described as using clients as voters in tie breaker situations (e.g., 50/50 tie-break situations where there are two servers), it will be appreciated that certain example embodiments may use clients in the "main" leader election process, e.g., to help avoid situations where no leaders are elected while also helping to avoid the need for a tie-breaker. For example, voting clients may be treated as having equal voting rights as servers during the initial election process. Thus, when a server requests votes, it requests votes from servers and clients alike (including at least those clients indicated as having voting rights). When the votes are counted, the servers' votes and clients' votes are counted as being equal. It will be appreciated that, in this scenario, unlike the even-split discussed above, the percentage of server votes does not necessarily matter. Instead, client votes will be requested even when a server has less than 50% of the server votes in the hope that the client votes will give it the majority. In certain example embodiments, the client voting may be initiated at the same time as the server voting (e.g., so that votes may be received from servers and eligible clients at the same time as one another). In different example embodiments, the server voting will be triggered first, followed by the client voting, but all votes will be counted together and/or as equal votes. In such scenarios, a subset of clients may be selected as described above, e.g., in terms of when they are selected and how they are selected. Furthermore, voting lists may be maintained as described above. In this scenario, the sum of servers and client voters may be selected so as to be an odd number.

The tie-breaker approach may be advantageous in that client voting happens as a secondary election step if and only if the primary server election step results in a tie. Thus, one technical advantage with the tie-breaker approach is that the clients are involved only when absolutely necessary (in the case of a tied election), so the processing can be quicker and more streamlined, with the leaders in turn being elected more quickly and the distributing computing system being healed or available more quickly, as ties should be relatively unlikely to occur. Indeed, in many and possibly most situations, the servers can manage the leader election on their own. It is noted that the inclusion of clients at the outset also may be technically advantageous from speed and availability perspectives in some instances, as an entire timeout process may be averted if there otherwise would be a tie that could be averted by using the client votes more quickly. The lag in counting client votes may be offset by the lack of a second timeout period, especially if the clients are low-latency clients. One additional advantage of the tie-breaker approach is the ability to handle multiple failures of odd-node clusters as well. When an odd node cluster loses one server, it becomes an even node cluster. If a network partition splits this newly formed even-node cluster further into two equal halves, the tie-breaking clients can be used to elect a leader from one of those halves.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape back-ups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Code Appendix A: Server Voter List Maintenance Logic

The following is an example of how the server's voter list maintenance logic may be implemented:

```
public class Server {
    private final Set<Server> peerServers;
    private final long startTime;
    private volatile State state = FOLLOWER;
    private volatile long lastTransactionId = 0;
    private final int voterLimit;
    private final SortedSet<VotingClient> voterCandidates = new
       TreeSet<>( );
    private final SortedSet<VotingClient> currentVoters = new
       TreeSet<>( );
    public void registerClientVoter(VotingClient votingClient) {
       votingClient.setCreationTimeStamp(System.currentTimeMillis( ));
       voterCandidates.add(votingClient);
       if (currentVoters.size( ) == 0) {
          currentVoters.add(votingClient);
       } else if (currentVoters.size( ) < voterLimit &&
             voterCandidates.size( ) % 2 == 1) {
          VotingClient oldestVoter = currentVoters.last( );
          Iterator<VotingClient> nextVoters =
             voterCandidates.tailSet(oldestVoter).iterator( );
          nextVoters.next( );   //The current oldest voter itself
          for (int i = 0; i < 2; i++) {
             VotingClient nextEligibleVoter = nextVoters.next( );
             nextEligibleVoter.confirmVotingRight( );
             currentVoters.add(nextEligibleVoter);
          }
       }
    }
```

-continued

```
    public void syncVotersList(SortedSet<VotingClient>
       voterCandidates) {
       this.voterCandidates.clear( );
       this.voterCandidates.addAll(voterCandidates);
    }
    public void deregisterClientVoter(VotingClient votingClient) {
       voterCandidates.remove(votingClient);
       if (currentVoters.remove(votingClient)) {
          VotingClient oldestVoter = currentVoters.last( );
          if (voterCandidates.size( ) > currentVoters.size( )) {
             VotingClient nextEligibleVoter =
                voterCandidates.tailSet(oldestVoter).iterator( ).next( );
             nextEligibleVoter.confirmVotingRight( );
             currentVoters.add(nextEligibleVoter);
          } else {
             oldestVoter.revokeVotingRight( );
             currentVoters.remove(oldestVoter);
          }
       }
    }
}
```

Code Appendix B: Server-Side Election Logic

The following is an example of how the server-side election logic may be implemented:

```
public class Server {
    private static final long ELECTION_TIMEOUT = 5000;
    private final Set<Server> peerServers;
    private final long startTime;
    private volatile State state = FOLLOWER;
    private volatile long lastTransactionId = 0;
    private volatile int electionTerm = 0;
    private final Set<Server> serverVotesReceived = new HashSet<>( );
    private final Set<Server> currentCandidates = new HashSet<>( );
    private final Set<VotingClient> clientVotesReceived = new
       HashSet<>( );
    private volatile boolean votingStarted;
    public Server(Set<Server> peerServers, int voterLimit) {
       this.peerServers = peerServers;
       this.voterLimit = voterLimit;
       this.startTime = System.currentTimeMillis( );
    }
    public void runElection( ) throws InterruptedException {
       electionTerm++;
       serverVotesReceived.add(this);
       currentCandidates.add(this);
       for (Server peerServer : peerServers) {
          peerServer.requestVote(this);
       }
       Thread.sleep(ELECTION_TIMEOUT);
       int peerVotes = serverVotesReceived.size( );
       if (peerVotes > (peerServers.size( )/2)) {
          state = LEADER;
       } else if (peerVotes == (peerServers.size( )/2)) {
          for (VotingClient voter : currentVoters) {
             voter.requestVote(this);
          }
          Thread.sleep(TIE_BREAK_TIMEOUT);
          int clientVotes = clientVotesReceived.size( );
          if (clientVotes > (currentVoters.size( )/2)) {
             state = LEADER;
          } else {
             state = FOLLOWER;
          }
       } else {
          state = FOLLOWER;
       }
       serverVotesReceived.clear( );
       if (state == LEADER) {
          for (Server peerServer : peerServers) {
             peerServer.setElectionTerm(electionTerm);
             peerServer.syncVotersList(this.currentVoters);
          }
       }
    }
}
```

```
/**
 * For another server to cast vote for this server
 */
public void castVote(Server server) {
    serverVotesReceived.add(server);
}
/**
 * For clients to cast tie-breaking votes for this server
 */
public void tieBreakingVote(VotingClient client) {
    clientVotesReceived.add(client);
}
public void requestVote(Server other) throws InterruptedException
{
    currentCandidates.add(other);
    if (!votingStarted) {
        votingStarted = true;
        Thread.sleep(ELECTION_TIMEOUT);
        Server winner = findWinner( );
        winner.castVote(this);
        serverVotesReceived.clear( );
        votingStarted = false;
    }
}
private Server findWinner( ) {
    Server winner = null;
    for (Server candidate : currentCandidates) {
        if (winner == null) {
            winner = candidate;
        } else {
            winner = findWinner(winner, candidate);
        }
    }
    return winner;
}
public static Server findWinner(Server server1, Server server2) {
    Server winner = null;
    if (server1.electionTerm > server2.electionTerm) {
        winner = server1;
    } else if (server2.electionTerm == server1.electionTerm) {
        if (server1.state == LEADER) {
            winner = server1;
        } else if (server2.state == LEADER) {
            winner = server2;
        } else {
            if (server1.lastTransactionId > server2.lastTransactionId) {
                winner = server1;
            } else if (server1.lastTransactionId ==
                    server2.lastTransactionId) {
                if (server1.startTime > server2.startTime) {
                    winner = server1;
                } else {
                    winner = server2;
                }
            } else {
                winner = server2;
            }
        }
    } else {
        winner = server2;
    }
    return winner;
}
}
```

Code Appendix C: Client-Side Election Logic

The following is an example of how the client-side election logic may be implemented:

```
public class VotingClient implements Comparable<VotingClient> {
    public static final long TIE_BREAK_TIMEOUT = 5000;
    private final String id;
    private volatile long creationTimeStamp;
    private volatile boolean eligible = false;
    private volatile boolean votingStarted;
    private volatile int lastVotedTerm;
    private final ArrayList<Server> candidates = new ArrayList<>(2);
    //At most 2 servers will attempt tie-breaking for a term
    public VotingClient(Set<Server> servers) {
        this.id = UUID.randomUUID( ).toString( );
        for (Server server : servers) {
            if (server.getState( ) == Server.State.LEADER) {
                server.registerClientVoter(this);
                break;
            }
        }
    }
    public void requestVote(Server server) throws InterruptedException
    {
        if (eligible) {
            if (server.getElectionTerm( ) > lastVotedTerm) {
                candidates.add(server);
                if (!votingStarted) {
                    votingStarted = true;
                    Thread.sleep(TIE_BREAK_TIMEOUT);
                    Server winner;
                    if (candidates.size( ) == 1) {
                        winner = server;
                    } else {
                        winner = Server.findWinner(candidates.get(0),
                            candidates.get(1));
                    }
                    winner.tieBreakingVote(this);
                    lastVotedTerm = server.getElectionTerm( );
                    candidates.clear( );
                    votingStarted = false;
                }
            }
        }
    }
}
```

What is claimed is:

1. A method of managing a distributed computing system including a plurality of servers organized in a cluster and a plurality of client devices operable to connect to the cluster and issue requests to the servers, each said server including first processing resources including at least one first processor and a first memory, each client device including second processing resources including at least one second processor and a second memory, one of the servers being elected as a leader and being responsible for maintaining consensus information among the other servers, the consensus information including data indicating a shared operating state of the servers in the cluster, which server in the plurality of servers is elected as the leader, and which client device(s) is/are eligible to vote, wherein the shared operating state relates to requests issuable by the client devices, and wherein the consensus information indicates that at least one client device is/are eligible to vote, the method comprising, for each said server:

determining whether a new leader election is to take place; and in response to a determination that a new leader election is to take place, the determination that the new leader election is to take place being made:

requesting votes for a new leader from the other server(s) in the plurality of servers;

receiving any votes sent from other server(s);

determining whether the respective server has won the election by receiving a clear majority of votes cast;

responsive to a determination that the respective server has won the election with a clear majority of the votes cast, distributing consensus information to the other server(s) about the respective server now being the leader; and responsive to a determination that the respective server has not won the election and that no other server in the plurality of servers has won the election:
requesting votes for a new leader from the client device(s) that is/are eligible to vote as indicated in the consensus information;
receiving any votes from the client device(s) that is/are eligible to vote; determining whether the respective server has won the election by receiving a clear majority of votes now cast, including votes cast by the client device(s) that is/are eligible voters; and
responsive to a determination that the respective server has won the election with a clear majority of votes now cast, including votes cast by the client device(s) that is/are eligible voters, distributing consensus information to the other server(s) about the respective server now being the leader.

2. The method of claim 1, further comprising, for each said server:
including a vote for itself when determining whether the respective server has won the election.

3. The method of claim 1, wherein the determination that the new leader election is to take place is made in response to a detection of a communication break between different ones of the servers and/or response to a change to the cluster's configuration.

4. The method of claim 1, wherein the reception of votes sent from other server(s) is practiced only if the respective server is in communication with the sending server; and
wherein the reception of votes from the client device(s) that is/are eligible to vote is practiced only if the respective server is in communication with the sending server.

5. The method of claim 1, wherein the number of servers plus the number of client devices eligible to vote is equal to an odd number.

6. The method of claim 1, wherein the leader maintains the consensus information to reflect which client device(s) is/are eligible to vote by:
receiving registration requests from client devices that indicate that the client devices are to be considered eligible to vote;
in response to a registration request being received from a given client device:
updating the consensus information to indicate that the given client device is eligible to vote if doing so would make the total number of client devices eligible to vote plus the number of servers an odd number; and
otherwise waiting to update the consensus information until another registration request is received from another client device, and updating the consensus information to indicate that both the given client device and the another client device are eligible to vote; determining when a client device eligible to vote has become unavailable; and responsive to a determination that a client device eligible to vote has become unavailable, updating the consensus information to indicate that either a further client device is no longer eligible to vote, or designating another client device as being eligible to vote.

7. The method of claim 1, wherein the client device(s) eligible to vote are controlled by the respective second processing resources to cast votes for servers according to a set of preprogrammed rules that take into account factors concerning relationships between the respective client device and the servers.

8. A non-transitory computer readable storage medium including instructions that, when executed by a given server in a distributed computing system including a plurality of servers organized in a cluster and a plurality of client devices operable to connect to the cluster and issue requests to the servers in which one of the servers is elected as a leader, cause that given server to execute operations comprising:
maintaining, when the given server is elected leader, consensus information among the other servers, the consensus information including data indicating a shared operating state of the servers in the cluster, which server in the plurality of servers is elected as the leader, and which client device(s) is/are eligible to vote, wherein the shared operating state relates to requests issuable by the client devices;
determining whether a new leader election is to take place; and in response to a determination that a new leader election is to take place:
requesting votes for a new leader from the other server(s) in the plurality of servers;
receiving any votes sent from other server(s);
determining whether the given server has won the election by receiving a clear majority of votes cast;
responsive to a determination that the given server has won the election with a clear majority of the votes cast, distributing consensus information to the other server(s) about the given server now being the leader; and
responsive to a determination that the given server has not won the election and that no other server in the plurality of servers has won the election:
requesting votes for a new leader from the client device(s) that is/are eligible to vote as indicated in the consensus information;
receiving any votes from the client device(s) that is/are eligible to vote;
determining whether the given server has won the election by receiving a clear majority of votes now cast, including votes cast by the client device(s) that is/are eligible voters; and
responsive to a determination that the given server has won the election with a clear majority of votes now cast, including votes cast by the client device(s) that is/are eligible voters, distributing consensus information to the other server(s) about the given server now being the leader.

9. A distributed computing system, comprising:
a plurality of servers organized in a cluster, each said server including first processing resources including at least one first processor and a first memory;
a plurality of client devices operable to connect to the cluster and issue requests to the servers, each client device including second processing resources including at least one second processor and a second memory;
wherein one of the servers is elected as a leader and is responsible for maintaining consensus information among the other servers, the consensus information including data indicating a shared operating state of the servers in the cluster, which server in the plurality of servers is elected as the leader, and which client device(s) is/are eligible to vote;
wherein the shared operating state relates to requests issuable by the client devices; and wherein the first processing resources of each server are configured to control the respective server to determine whether a new leader election is to take place and, in response to a determination that a new leader election is to take place:

request votes for a new leader from the other server(s) in the plurality of servers;

receive any votes sent from other server(s);

determine whether the respective server has won the election by receiving a clear majority of votes cast;

responsive to a determination that the respective server has won the election with a clear majority of the votes cast, distribute consensus information to the other server(s) about the respective server now being the leader; and responsive to a determination that the respective server has not won the election and that no other server in the plurality of servers has won the election:

request votes for a new leader from the client device(s) that is/are eligible to vote as indicated in the consensus information;

receive any votes from the client device(s) that is/are eligible to vote;

determine whether the respective server has won the election by receiving a clear majority of votes now cast, including votes cast by the client device(s) that is/are eligible voters; and responsive to a determination that the respective server has won the election with a clear majority of votes now cast, including votes cast by the client device(s) that is/are eligible voters, distribute consensus information to the other server(s) about the respective server now being the leader.

10. The system of claim 9, wherein each said server is configured to include a vote for itself when determining whether the respective server has won the election.

11. The system of claim 9, wherein the determination that the new leader election is to take place is made in response to a detection of a communication break between different ones of the servers.

12. The system of claim 9, wherein the determination that the new leader election is to take place is made in response to a change to the cluster's configuration.

13. The system of claim 9, wherein the determination that the new leader election is to take place is made in response to one or more new servers being added to the cluster and/or one or more existing servers being removed from the cluster.

14. The system of claim 9, wherein the reception of votes sent from other server(s) is practiced only if the respective server is in communication with the sending server.

15. The system of claim 9, wherein the reception of votes from the client device(s) that is/are eligible to vote is practiced only if the respective server is in communication with the sending client.

16. The system of claim 9, wherein the plurality of servers has exactly 2 servers.

17. The system of claim 9, wherein the number of servers plus the number of client devices eligible to vote is equal to an odd number.

18. The system of claim 9, wherein the leader maintains the consensus information to reflect which client device(s) is/are eligible to vote by:

receiving registration requests from client devices that indicate that the client devices are to be considered eligible to vote; and in response to a registration request being received from a given client device:

updating the consensus information to indicate that the given client device is eligible to vote if doing so would make the total number of client devices eligible to vote plus the number of servers an odd number; and otherwise waiting to update the consensus information until another registration request is received from another client device, and updating the consensus information to indicate that both the given client device and the another client device are eligible to vote.

19. The system of claim 18, wherein the leader maintains the consensus information to reflect which client device(s) is/are eligible to vote by rejecting subsequent registration requests when the number of client devices eligible to vote meets a predetermined value.

20. The system of claim 18, wherein the leader maintains the consensus information to reflect which client device(s) is/are eligible to vote by:

determining when a client device eligible to vote has become unavailable; and responsive to a determination that a client device eligible to vote has become unavailable, updating the consensus information to indicate that either a further client device is no longer eligible to vote, or designating another client device as being eligible to vote.

21. The system of claim 9, wherein the client device(s) eligible to vote are controlled by the respective second processing resources to cast votes for servers according to a set of preprogrammed rules.

22. The system of claim 21, wherein the preprogrammed rules indicate which server should be voted for considering factors including term number, prior leader/follower state, transaction identifier, and server uptime.

23. The system of claim 9, wherein each said server receives only those votes cast for it.

24. A first server in a distributed computing system comprising at least one second server, the servers being organized in a cluster and each including first processing resources including at least one first processor and a first memory, the distributed computing system further comprising a plurality of client devices operable to connect to the cluster and issue requests to the servers, each client device including second processing resources including at least one second processor and a second memory, wherein one of the servers is elected as a leader and is responsible for maintaining consensus information among the other servers, the consensus information including data indicating a shared operating state of the servers in the cluster, which server in the plurality of servers is elected as the leader, and each client device eligible to vote, wherein the shared operating state relates to requests issuable by the client devices, and wherein the first processing resources of the first server are configured to control the first server to determine whether a new leader election is to take place and, in response to a determination that a new leader election is to take place:

request votes for a new leader from each other server in the plurality of servers;

receive any votes sent from each other server;

determine whether the first server has won the election by receiving a clear majority of votes cast;

responsive to a determination that the first server has won the election with a clear majority of the votes cast, distribute consensus information to each other server about the first server now being the leader; and responsive to a determination that the first server has not won the election and that no other server in the plurality of servers has won the election:

request votes for a new leader from each client device eligible to vote as indicated in the consensus information;

receive any votes from each client device eligible to vote;

determine whether the first server has won the election by receiving a clear majority of votes now cast, including votes cast by each client device eligible to vote; and responsive to a determination that the first server has won the election with a clear majority of votes now cast, including votes cast by each client device eligible to vote, distribute consensus information to each other server about the first server now being the leader.

* * * * *